(12) United States Patent
Meng et al.

(10) Patent No.: US 9,888,229 B2
(45) Date of Patent: Feb. 6, 2018

(54) DISPARITY ESTIMATION FOR MULTIVIEW IMAGING SYSTEMS

(71) Applicants: Lingfei Meng, Redwood City, CA (US); Kathrin Berkner, Los Altos, CA (US)

(72) Inventors: Lingfei Meng, Redwood City, CA (US); Kathrin Berkner, Los Altos, CA (US)

(73) Assignee: Ricoh Company, Ltd., Tokyo (JP)

( * ) Notice: Subject to any disclaimer, the term of this patent is extended or adjusted under 35 U.S.C. 154(b) by 295 days.

(21) Appl. No.: 14/312,586

(22) Filed: Jun. 23, 2014

(65) Prior Publication Data

US 2015/0373316 A1    Dec. 24, 2015

(51) Int. Cl.
*H04N 13/02* (2006.01)
*G06T 7/557* (2017.01)

(52) U.S. Cl.
CPC ......... *H04N 13/0282* (2013.01); *G06T 7/557* (2017.01); *H04N 13/0232* (2013.01); *G06T 2207/10052* (2013.01)

(58) Field of Classification Search
IPC ............................................ H04N 2013/0081
See application file for complete search history.

(56) References Cited

U.S. PATENT DOCUMENTS

| 7,050,646 B2* | 5/2006 | Xu ........................ G06K 9/38 348/619 |
| 8,619,082 B1 | 12/2013 | Ciurea et al. |
| 8,619,177 B2 | 12/2013 | Perwass et al. |
| 2007/0075997 A1* | 4/2007 | Rohaly ................. G06T 7/0018 345/419 |
| 2010/0166074 A1* | 7/2010 | Ho ..................... H04N 13/0059 375/240.16 |
| 2010/0232016 A1* | 9/2010 | Landa .................. G02B 5/1814 359/466 |
| 2011/0050853 A1* | 3/2011 | Zhang ................. H04N 13/026 348/44 |
| 2013/0335527 A1* | 12/2013 | Takahashi ............ H04N 19/597 348/43 |
| 2014/0340478 A1* | 11/2014 | Kwong ................ H04N 19/597 348/43 |

OTHER PUBLICATIONS

Adelson, E. H. et al., "Single Lens Stereo with a Plenoptic Camera," IEEE Transactions on Pattern Analysis and Machine Intelligence, Feb. 1992, pp. 99-106, vol. 14, No. 2.
Bando, Y. et al., "Extracting Depth and Matte Using a Color-Filtered Aperture," in ACM Transactions on Graphics (TOG), ACM, 2008, 9 pages, vol. 27, No. 5.

(Continued)

*Primary Examiner* — Tracy Y Li
(74) *Attorney, Agent, or Firm* — Fenwick & West LLP

(57) ABSTRACT

This invention presents an approach to first estimate a depth/disparity map using spectrally coded plenoptic camera, and then based on the disparity map the parallax between different spectral channels is rectified. Based on our new technique, we can reconstruct not only multispectral images but also a depth/disparity map. Moreover, the quality of reconstructed spectral images is significantly improved using our parallax rectification.

20 Claims, 7 Drawing Sheets

(4 of 7 Drawing Sheet(s) Filed in Color)

(56) References Cited

OTHER PUBLICATIONS

Cavanaugh, D. B. et al., "VNIR Hypersensor Camera System," in SPIE Optical Engineering+ Applications, International Society for Optics and Photonics, SPIE, 2009, pp. 74 5700-74 5700, vol. 7457.
Horstmeyer, R. et al., "Flexible Multimodal Camera Using a Light Field Archi-tecture," 2009 IEEE International Conference on Computational Photography (ICCP), IEEE, 2009, pp. 1-8.
Kittle, D. et al., "Multiframe Image Estimation for Coded Aperture Snapshot Spectral Imagers," Applied Optics, Dec. 20, 2010, pp. 6824-6833, vol. 49, No. 36.
Levin, A. et al., "Image and Depth from a Conventional Camera with a Coded Aperture," ACM Transactions on Graphics (TOG), 2007, Article 70, pp. 70-1-70-9, vol. 26, No. 3.
Ng, R. et al., "Light Field Photography with a Hand-Held Plenoptic Camera," Stanford Computer Science Technical Report CSTR, 2005, pp. 1-11, vol. 2, No. 11.
Wilburn, B. et al., "High Performance Imaging Using Large Camera Arrays," in ACM Transactions on Graphics (TOG), ACM, 2005, pp. 765-776, vol. 24, No. 3.

\* cited by examiner

Object 150

Object 150

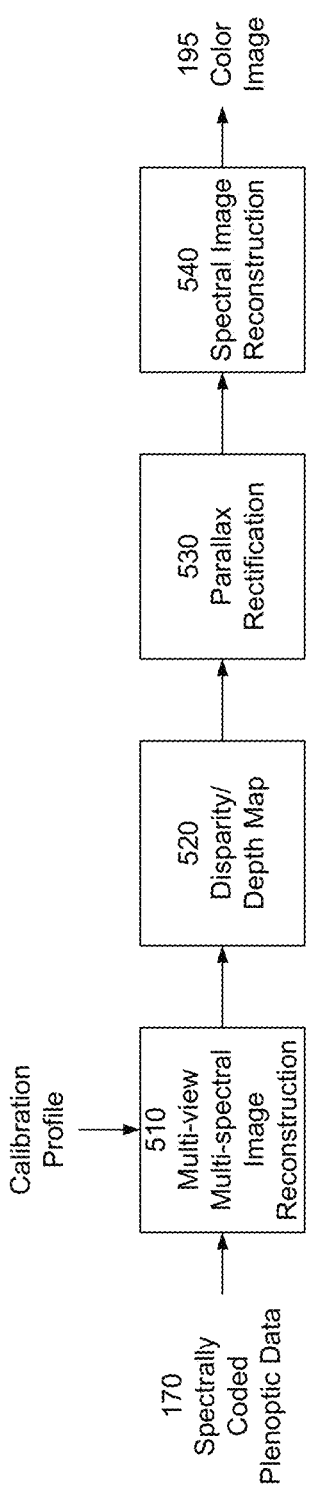
FIG. 5
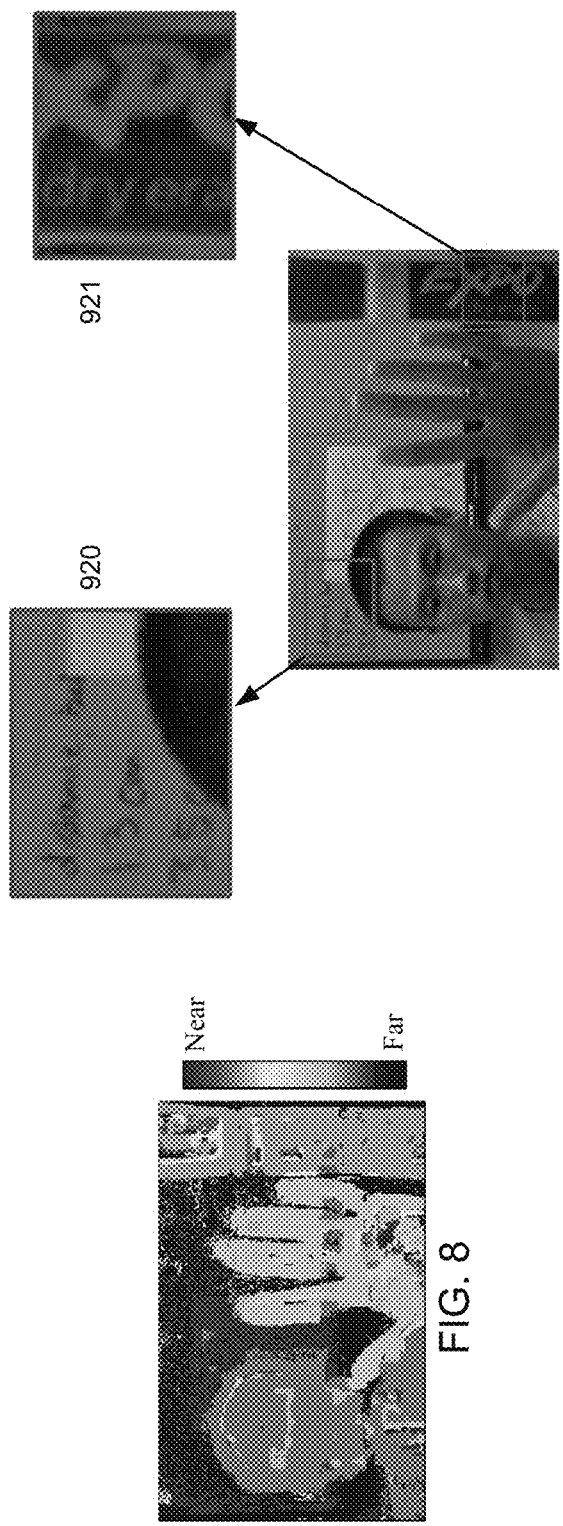
FIG. 9
FIG. 8

DISPARITY ESTIMATION FOR MULTIVIEW IMAGING SYSTEMS

BACKGROUND OF THE INVENTION

1. Field of the Invention

This invention relates generally to plenoptic imaging systems and other types of multiview imaging systems, including spectrally-coded plenoptic imaging systems.

2. Description of the Related Art

A spectrally coded plenoptic camera can collect multispectral images in a single snapshot by use of a filter array in the pupil plane of the main lens. Ideally the light should be focused on the microlens array in order to have good spectral reconstruction. However, in reality the light is not necessarily always focused on the microlens array, especially when the objects in the scene are located at different depths. This leads to disparities and misalignment of different spectral images.

A similar phenomenon can also occur in other types of multispectral multiview imaging systems. For example, a system with multiple cameras that capture different spectrally filtered images from different viewpoints typically will suffer from a similar problem. The different color images exhibit disparities with respect to each other, so recombining the images without compensation can lead to color fringing and other artifacts.

Thus, there is a need for approaches to compensate for disparities.

SUMMARY

The present invention overcomes the limitations of the prior art by estimating the disparity/depth by using multiple multiview multispectral images and taking advantage of the relationship between disparities for images taken from different viewpoints.

In one approach, the disparities estimate is based on three or more images of a scene, where the images are taken from different viewpoints and contain different spectral content. The disparities between images are modeled as a function of (a) disparity parameters and (b) the differences in viewpoint between the images. The disparity parameter is estimated based on the collected images, taking into account the viewpoint differences between images.

Other aspects of the invention include components, devices, systems, improvements, methods, processes, applications and other technologies related to the foregoing.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention has other advantages and features which will be more readily apparent from the following detailed description of the invention and the appended claims, when taken in conjunction with the accompanying drawings, in which:

FIG. 5 is a flow diagram of a method for reconstructing color images with disparity compensation.

FIG. 8 is a disparity map of the images shown in FIG. 4.

FIG. 9 is a spectrally reconstructed image of those shown in FIG. 4.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1A:
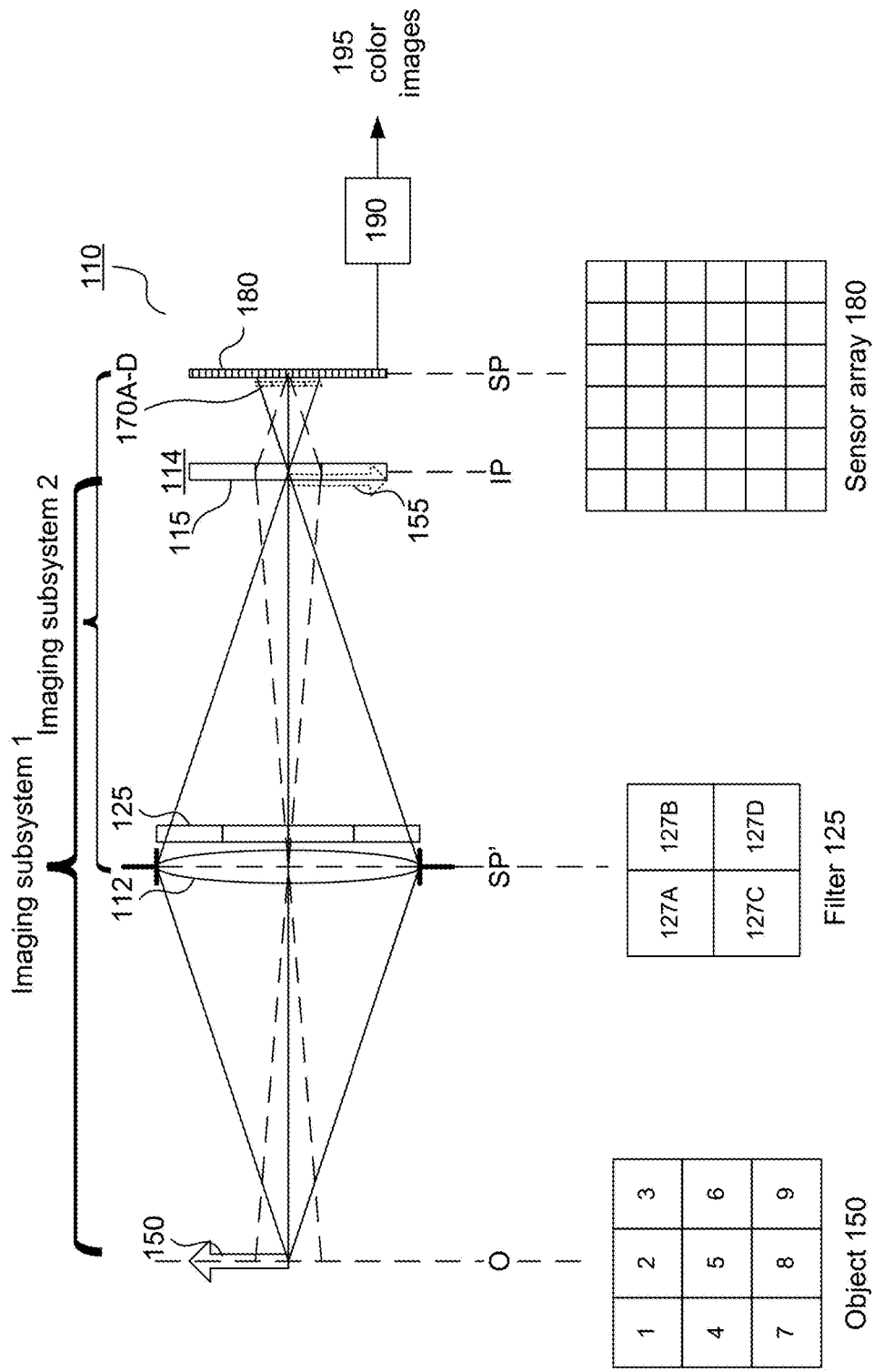
FIGS. 1A-1B are diagrams illustrating a spectrally-coded plenoptic imaging system.
Figure 1B:
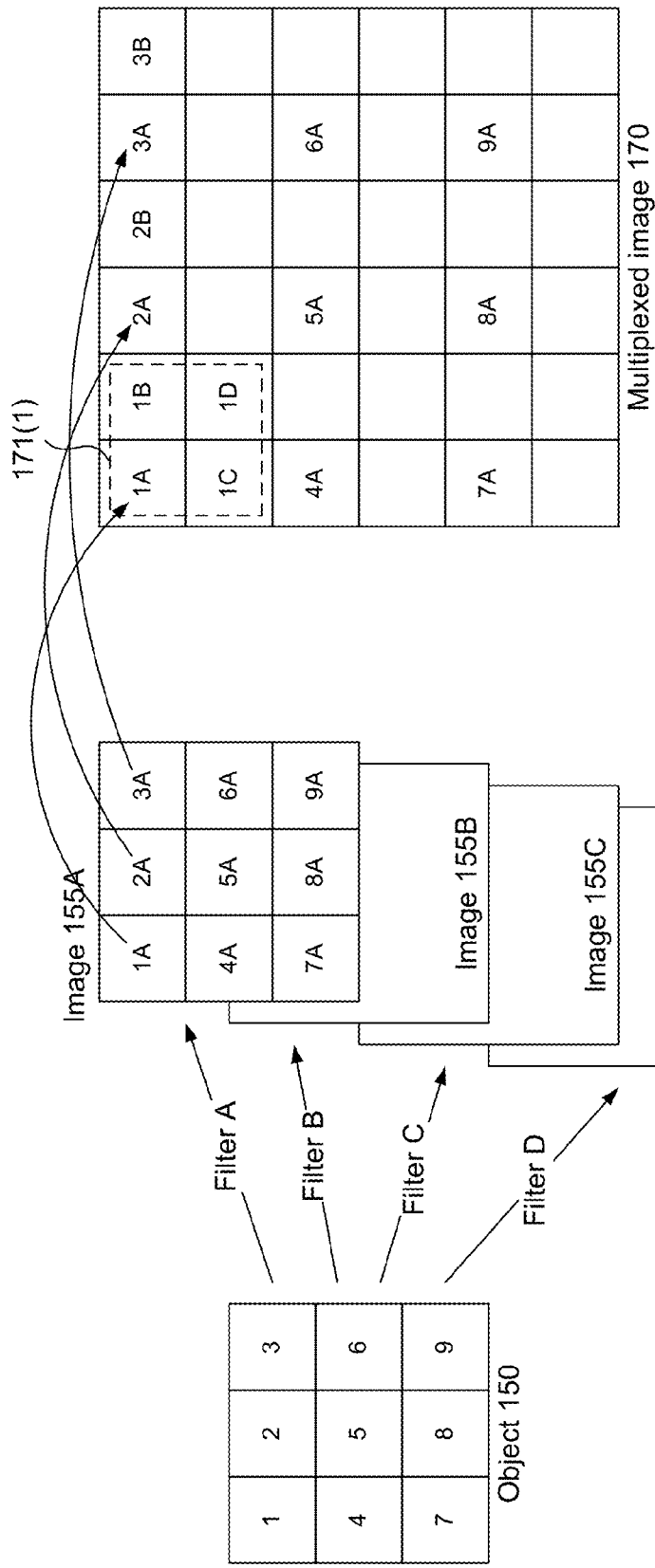

FIGS. 1A-1B are diagrams illustrating an example of a spectrally-coded plenoptic imaging system. The spectrally-coded plenoptic imaging system 110 includes primary imaging optics 112 (represented by a single lens in FIG. 1A), a secondary imaging array 114 (an array of image forming elements 115) and a sensor array 180. The secondary imaging array 114 may be referred to as a microimaging array. The secondary imaging array 114 and sensor array 180 together may be referred to as a plenoptic sensor module. These components form two overlapping imaging subsystems, shown as subsystem 1 and subsystem 1 in FIG. 1A.

For convenience, the imaging optics 112 is depicted in FIG. 1A as a single objective lens, but it should be understood that it could contain multiple elements. The objective lens 112 forms an optical image 155 of the object 150 at an image plane IP. The microimaging array 114 is located at the image plane IP. The system in its entirety forms spatially multiplexed and interleaved optical images 170 at the sensor plane SP. Examples of microimaging arrays 114 include microlens arrays, arrays of pinholes, micromirror arrays, checkerboard grids and waveguide/channel arrays. The microimaging array 114 can be a rectangular array, hexagonal array or other types of arrays. The sensor array 180 is also shown in FIG. 1A.

A color filter module 125 is positioned at a plane SP' conjugate to the sensor plane SP. The actual physical location may be before, after or in the middle of the imaging optics 112. The color filter module contains a number of spatially multiplexed filters 127A-D. In this example, the color filter module 125 includes a rectangular array of filters 127, as shown in the bottom portion of FIG. 1A. This example uses a color filter module 125, but other types of filters and combinations of filters can be used, including polarization filters, neutral density filters and no filters.

The bottom portion of FIG. 1A provides more detail. In this diagram, the object 150 is divided into a 3×3 array of regions, which are labeled 1-9. The color filter module 125 is a 2×2 rectangular array of individual filters 127A-D. For example, each filter 127A-D may have a different spectral response. The sensor array 180 is shown as a 6×6 rectangular array.

FIG. 1B illustrates conceptually how the spatially multiplexed optical images 170A-D are produced and interleaved at sensor array 180. The object 150, if captured and filtered by filter 127A, would produce an optical image 155A. To distinguish filtered optical image 155A from an unfiltered image of the object, the 3×3 regions are labeled with the suffix A: 1A-9A. Similarly, the object 150 filtered by filters 127B,C,D, would produce corresponding optical images 155B,C,D with 3×3 regions labeled 1B-9B, 1C-9C and 1D-9D. Each of these four optical images 155A-D is filtered by a different filter 127A-D within filter module 125 but they are all produced simultaneously by the plenoptic imaging system 110.

The four optical images 155A-D are formed in an interleaved fashion at the sensor plane, as shown in FIG. 1B. Using image 155A as an example, the 3×3 regions 1A-9A from optical image 155A are not contiguous in a 3×3 block within optical image 170. Rather, regions 1A, 1B, 1C and 1D, from the four different optical images, are arranged in a 2×2 fashion in the upper left of optical image 170 (the inversion of image 170 is neglected for clarity). Regions 1-9 are similarly arranged. Thus, the regions 1A-9A that make up optical image 170A are spread out across the composite optical image 170, separated by portions of the other optical images 170B-D. Put in another way, if the sensor is a rectangular array of individual sensor elements, the overall array can be divided into rectangular subarrays 171(1)-(9) of sensor elements (only one subarray 171(1) is shown in FIG. 1B). For each region 1-9, all of the corresponding regions from each filtered image are imaged onto the subarray. For example, regions 1A, 1B, 1C and 1D are all imaged onto subarray 171(1). Note that since the filter module 125 and sensor array 180 are located in conjugate planes, each imaging element 115 in array 114 forms an image of the filter module 125 at the sensor plane SP. Since there are multiple imaging elements 115, multiple images 171 of the filter module 125 are formed.

The multiplexed image 170 can be processed by processing module 190 to reconstruct desired images of the object. The processing could be deinterleaving and demultiplexing. It could also include more sophisticated image processing. In this example, the desired images are multispectral images 195 of the object 150 (e.g., RGB color images or XYZ color images) which have been compensated for disparity. In one implementation, the color filter module 125 is designed so that the filters 127 have spectral responses matched to the different color components. In other implementations, the filters 127 could be broad band, narrow band, or combinations of the two.

It should be noted that FIG. 1 has been simplified to illustrate underlying concepts. For example, the object 150 was artificially divided into an array in order to more easily explain the overall imaging function. The invention is not limited to arrayed objects. As another example, most practical systems will use significantly larger arrays, particularly at the sensor array and possibly also at the filter module. In addition, there need not be a 1:1 relationship between the 6×6 regions at the sensor plane and the underlying sensor elements in the sensor array. Each region could correspond to multiple sensor elements, for example. As a final example, the regions labeled 1 in the object, 1A in the filtered image 155A and 1A in the composite image 170 do not have to be exact images of each other. In some designs, region 1A within image 170 may capture the filtered energy approximately from region 1 in the object 150, but it may not actually be an image of region 1. Thus, the energy collected by sensor elements in region 1A of image 170 may be integrating and sampling the image (or some transformation of the image) in region 1 in object 150, rather than representing a geometrical reproduction of the object at that region. In addition, effects such as parallax, vignetting, diffraction and optical propagation may affect any image formation.

The approach shown in FIG. 1 has several advantages. First, multiple optical images 170A-D are captured simultaneously at the sensor plane. Second, each captured image is filtered by a filter 127A-D within the color filter module 125, and each filter 127 may be designed to implement different filtering functions. For convenience, the light distribution incident on the sensor array 180 will be referred to as a color plenoptic image 170, and the effect of the color filter module may be referred to as spectral-coding. Hence, the system 110 is referred to as a spectrally-coded plenoptic imaging system. Furthermore, since the color filter module 125 is located at a conjugate plane SP' rather than the actual sensor plane SP, and since this typically means that the color filter module will be much larger compared to what would be required at the sensor plane, the tolerances and other mechanical requirements on the color filter module are relaxed. This makes it easier to manipulate the color filter module, compared to if the color filter module were located at the sensor plane (e.g., if attached to the sensor assembly).

Further note that, in the system shown in FIGS. 1A-1B, the optical images 155A-D are registered with each other. That is, optical image 155A captures the same object region as optical images 155B,C,D. This is because the object is "in focus," meaning that the image plane for the object is coincident with the location of the microimaging array 114. Now consider what happens when the object is "out of focus," as illustrated in FIGS. 2A-2B.

Figure 2A:
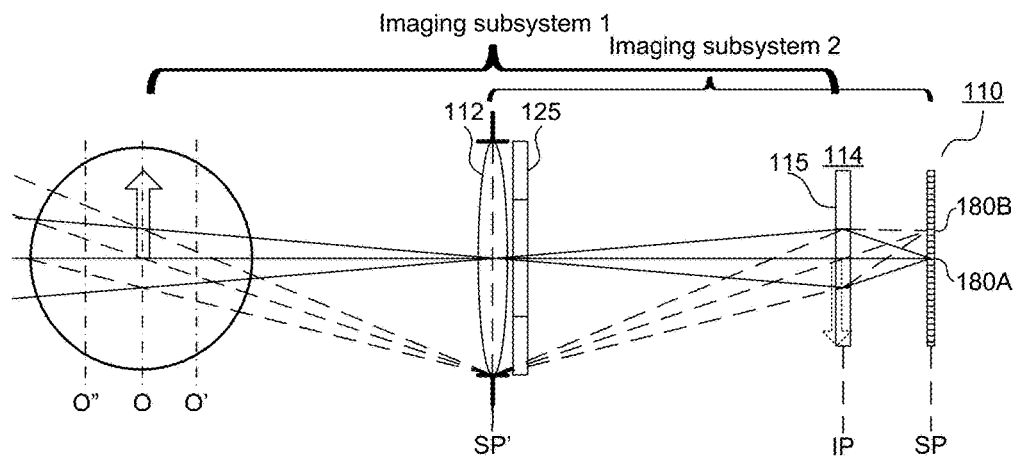
FIG. 2A is a diagram illustrating disparities in a spectrally-coded plenoptic imaging system.
Figure 2B:
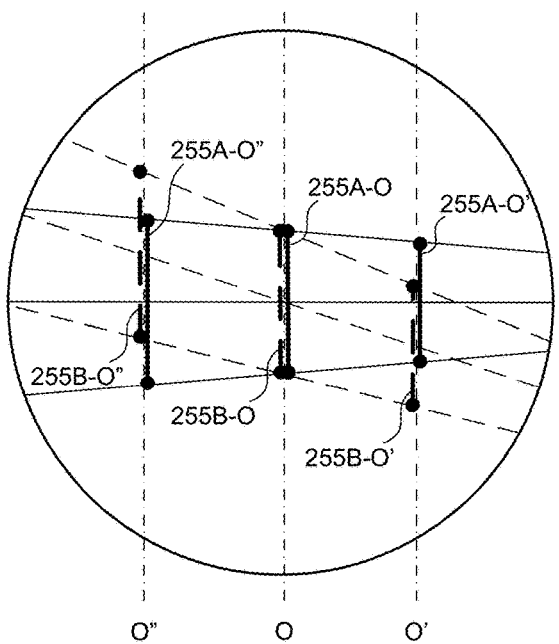
FIG. 2B is a magnification of the object area of FIG. 2A.

In FIG. 2A, consider two points in the sensor plane: 180A and 180B. Point 180A is on-axis located under the middle microlens, and point 180B is shifted away from the center point 180A but still under the same middle microlens. First trace rays backwards from point 180A. These rays are shown by the solid lines. Also trace rays backwards from point 180B. These rays are shown by the dashed lines. These rays represent the cone of rays that will be collected by the respective sensor point 180. Rays that fall within the solid cone will be collected by sensor point 180A, and rays that fall within the dashed cone will be collected by sensor point 180B. Where these rays intersect the object represents the object region collected by the respective sensor point 180.

For example, first consider the solid rays for point 180A. FIG. 2B shows a magnified view of the object region of FIG. 2A. If the object is located at plane O (i.e., the "in focus" condition), then the sensor point 180A will collect rays from object region 255A-O, as denoted by the heavy solid line in FIG. 2B. If the object is "out of focus," that means the image is no longer formed exactly at plane IP or, equivalently, that the object is no longer located exactly at plane O. Rather, the object may be located before or after plane O, for example at planes O' or O". If the object is located at plane O' (i.e., "out of focus"), then the sensor point 180A will collect rays from object region 255A-O'. Similarly, if the object is located at plane O" (i.e., also "out of focus"), then the sensor point 180A will collect rays from object region 255A-O".

A similar analysis can be made for sensor point 180B. The dashed rays define the cone of rays collected by sensor point 180B. If the object is located at "in focus" plane O, then the sensor point 180B will collect rays from object region 255B-O, as denoted by the heavy dashed line in FIG. 2B. For an object at plane O' or O", the sensor point 180B will collect rays from object region 255B-O' or 255B-O", respectively. This type of analysis can be repeated for any of the points on the sensor plane under the same microlens, and it can also be repeated for the other microlenses.

Note that when the object is in focus, object regions 255A-O and 255B-O are coincident. That is, each sensor point 180 collects light from the same object region. However, when the object is out of focus, different sensor points collect light from object regions that are shifted relative to each other. At object plane O', sensor 180A collects light from object region 255A-O', sensor 180B collects light from object region 255B-O', and the two object regions 255A-O' and 255B-O' are not coincident. Rather, they are shifted with respect to each other. This shift is also referred to as disparity. Similarly, for object plane O", the two object regions 255A-O" and 255B-O" are also shifted with respect to each other, but the disparity is in the other direction.

FIG. 2 illustrates disparity in the object plane. That is, each sensor point 180 collects light from slightly shifted object areas. However, the following description is based mostly on disparity in the sensor plane. That is, the light produced by an object point will not all be collected at a single sensor point. Rather, it will be shifted across a range of sensor points, with the shift depending on the ray path through the system. Rays traversing through different points of the aperture will be shifted by different amounts at the sensor plane. Note also that rays traversing through different points of the aperture will be filtered by different filters 127, so different spectral images will exhibit different disparities (due to the filters occupying different positions within the aperture), even if there is zero chromatic aberration.

Figure 3A:
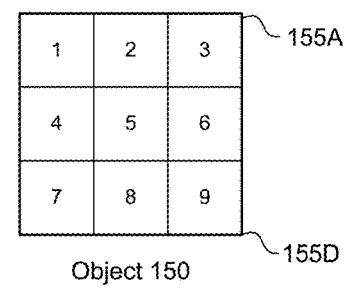
FIGS. 3A-3B are diagrams illustrating disparities in a spectrally-coded plenoptic imaging system.
Figure 3B:
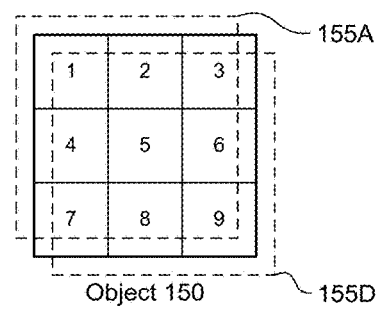

The concept of disparity is shown further in FIGS. 3A-3B. FIG. 3A shows the situation when the object is "in focus." The nine squares labeled 1-9 represent the object of FIG. 1. In FIG. 3A, images 155A and 155D are represented as dashed squares. However, these dashed squares are not visible because they are coincident with the heavy outer border of the object 150.

In FIG. 3B, the object 150 is "out of focus." That is, the object forms an image that is not coincident with the location of the microimaging array 114. One effect of this defocusing is that images 155A and 155D shift with respect to each other, as shown in FIG. 3B. For clarity, images 155B and 155C are not shown. The four images 155A-D then form a set of images that are shifted with respect to each other. If these four images are combined without disparity correction, the resulting color image will exhibit artifacts such as color fringing.

Figure 4A:
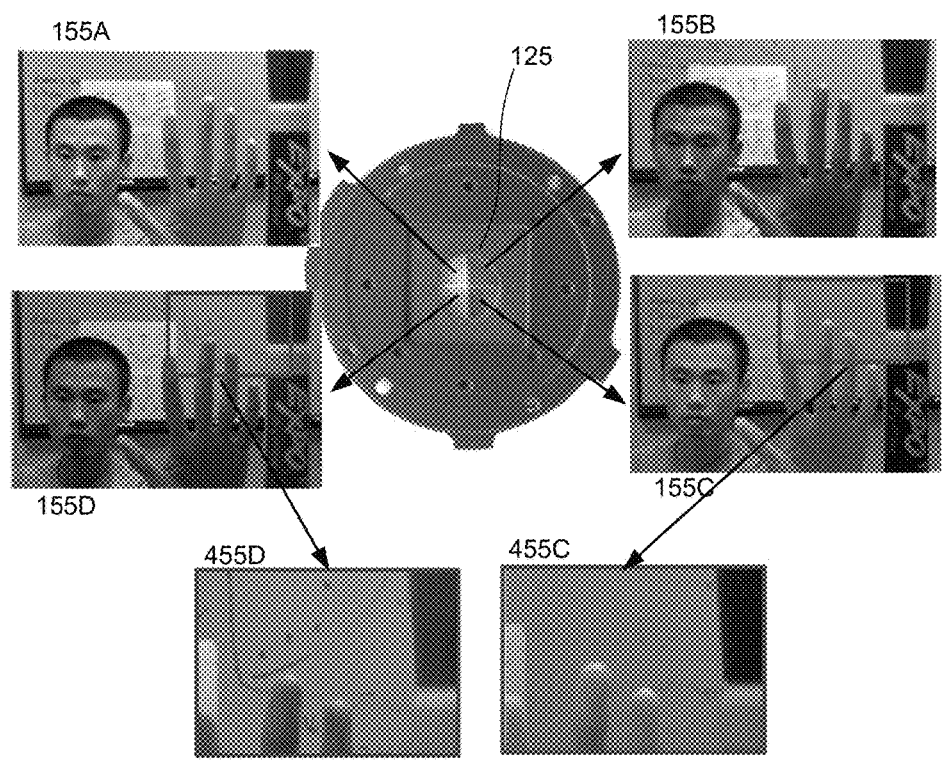
FIGS. 4A-4B are images illustrating spectral disparities in a spectrally-coded plenoptic imaging system.
Figure 4B:
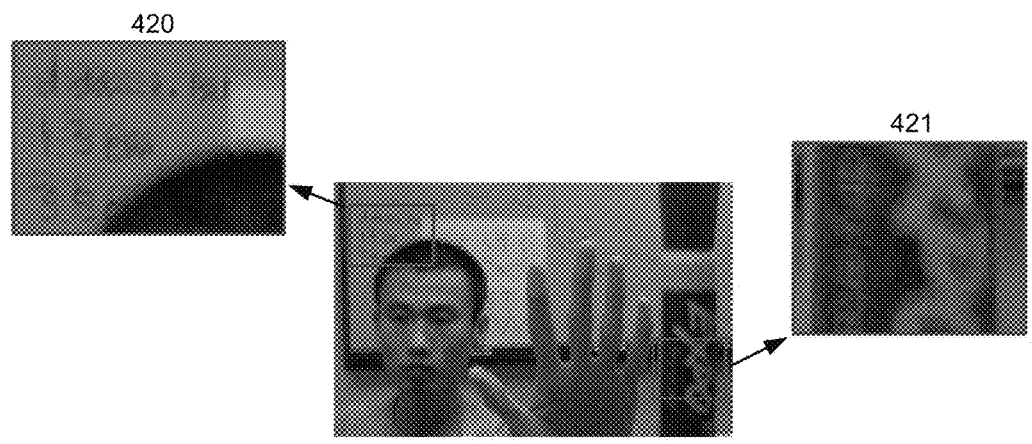

To illustrate the problem, an example is shown in FIGS. 4A-4B. In this example, the color filter module 125 is divided into four spatially multiplexed filters 127A-D, which are amber, blue, red and green. These filters are broad color filters. For example, the red filter is a broad band filter that passes wavelengths in the red portion of the spectrum. The scene includes objects of different colors at different depths. The marker in the foreground is a green marker. The writing on the whiteboard in the background is either black or red. The grayscale images in FIG. 4A are four color-filtered images, where the captured intensity is expressed as grayscale. Image 155A is the amber-filtered image, image 155B is the blue-filtered image, image 155C is the red-filtered image and image 155D is the green-filtered image.

FIG. 4B shows a color image reconstructed from the spectrally filtered images 155. The color image was reconstructed without estimating disparities and without any parallax rectification. The spectral images were reconstructed from the four different filter partitions, and each partition passes the light through a different portion of the aperture. This creates parallax between different spectral channels if the light is not perfectly focused on the microlens array, and color fringing is quite observable as shown in FIG. 4B. The color fringing changes when the object is at different distances, as is visible from the magnified portions of FIG. 4B. Detail 420 shows the reconstruction of the black writing on the whiteboard. In this detail, separate displaced red, green and amber images can be seen. Detail 421 shows the green marker, which also shows color artifacts.

In traditional stereo matching algorithms, disparities may be estimated by comparing the relative positions of the same objects in different images. However, this is more difficult in multispectral images because an object may not appear in all images. In detail 455D of FIG. 4A, the red writing on a white background is visible, because it shows up as dark writing on a light background in the green image. The green filter basically filters out the red writing, creating contrast with the light background. However, in detail 455C of FIG. 4A, the red writing is not visible because in the red-filtered image, the red writing shows up as light writing on a light background. Thus, it can be seen that the same object presents in one spectral band may completely disappear at another spectral band. Therefore, estimating disparity/depth based on two images using traditional stereo matching algorithms would not work with these two images.

FIG. 5 is a flow diagram of a method for reconstructing color images with disparity compensation. Referring to FIG. 1A, this method can be implemented by processor 190. The spectrally coded plenoptic data 170 is captured by the plenoptic camera. Based on the camera layout (which is provided by the calibration profile in FIG. 5), the multiplexed image 170 is processed 510 to produce the underlying filtered images 155. These images will be referred to as multispectral multiview images.

Disparities are estimated 520 from three or more of these images, which are taken from different viewpoints and with different spectral content. The relative disparities between different sets of images can be parameterized and then the images can be used to estimate the disparities. In one approach, the disparities between images are modeled as a function of the viewpoint differences between the images and of disparity parameters. The parameter is estimated based on the collected multispectral multiview images. Thus, if an object is missing from one image, that will be compensated by its appearance in other images.

The disparities depend on the depth of the object with respect to the sensor. Preferably, a disparity map is estimated 520. This is an estimate of the disparities at different points in the image. If the camera design is known, a relation between disparity and depth can be derived. Therefore, the disparity information may take the form of a depth estimate or depth map instead. Once the disparities have been estimated 520, the parallax between different spectral channels and different views is rectified 530 using the estimated disparity/depth map. Finally the spectral images are reconstructed 540 based on the parallax rectification.

Figure 6A:
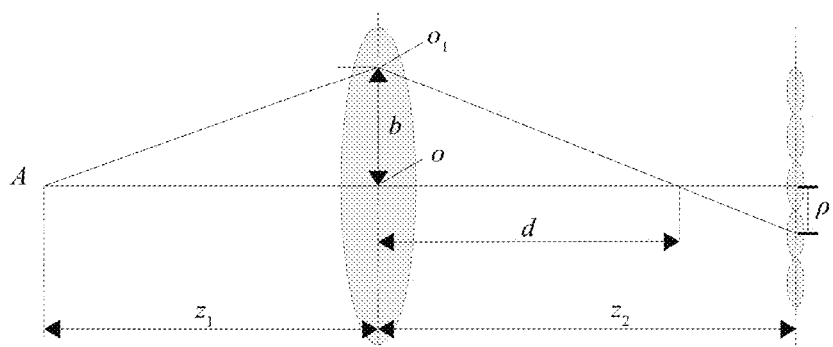
FIG. 6A is a geometric optics model of an object point at a far distance.
Figure 6B:
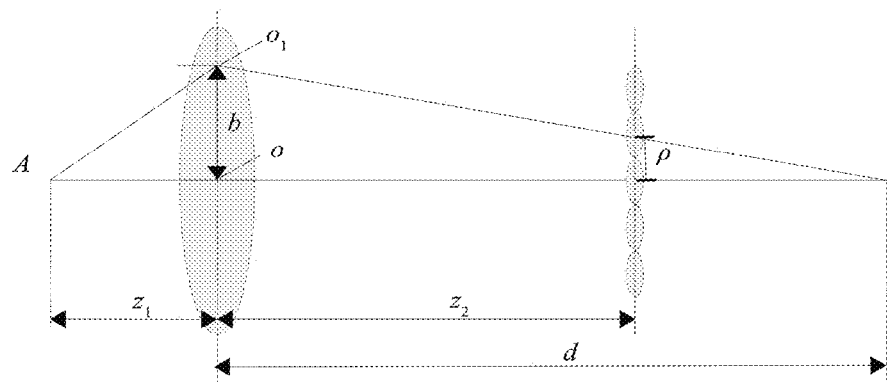
FIG. 6B is a geometric optics model of an object point at a near distance.

The following is an example of how to estimate disparities from multiple images. We first derive the relationship between the baseline between two viewpoints and the disparities of reconstructed multiview images using a simplified geometric optics model, and then analyze the derivation when the object is at different depths. The spectrally coded plenoptic camera has a filter array placed in the aperture plane and each spectral filter occupies a portion of the main lens. An example is shown in FIGS. 6A-6B. For simplicity the filter array is not shown.

The center of the main lens is indicated as o. Rays that traverse different points of the main lens aperture will exhibit different amounts of disparity. That is, where a ray intersects the main lens aperture is an indication of that image's viewpoint. In FIG. 6A, consider a ray that traverses point $o_1$. We will calculate the disparity of this ray relative to the ray through central point o. For convenience, the points o and $o_1$ may sometimes be referred to as viewpoints o and $o_1$. Point o defines a reference viewpoint. In FIG. 6A, the object point A is at a far distance and the image is out-of-focus at the microlens array plane. The light refracted from the same object point A is projected onto different lenslets, and there is a shift (i.e., disparity) of the object point A on the microlens array.

The variables shown in FIGS. 6A-6B are defined below in Table 1.

TABLE 1

Variables used in FIG. 6

| Parameter | Definition |
|---|---|
| $z_1$ | Distance between object and main lens |
| $z_2$ | Distance between main lens and microlens array |
| d | Distance between main lens and conjugate focus of object |
| ρ | Shift of object point at the microlens array, for viewpoint $o_1$ |
| o | Center of main lens (which is taken as the reference viewpoint) |
| $o_1$ | Intersection of ray with main lens (which defines the viewpoint of interest) |
| b | Baseline distance between the two viewpoints |
| F | Focal length of main lens |
| $d_m$ | Diameter of lenslet |
| $n_p$ | Disparity (in pixels) between reconstructed images from the two viewpoints o and $o_1$ |

The shift of the object point A at the microlens array can be expressed as $$\rho = n_p d_m \quad (1)$$

where ρ is the amount of shift, $n_p$ is the shift of the point in pixels of the reconstructed image, and $d_m$ is the diameter of each lenslet. From similar triangles in FIG. 6A, it can be seen that $$\frac{-\rho}{b} = \frac{d - z_2}{d} \quad (2)$$

Based on the lens-maker's equation we have $$\frac{1}{d} = \frac{1}{F} - \frac{1}{z_1} \quad (3)$$

Substituting Eqs. (1) and (3) into Eq. (2) yields $$\frac{n_p}{b} = \frac{z_2}{d_m}\left(\frac{1}{F} - \frac{1}{z_1}\right) - \frac{1}{d_m} \quad (4)$$

The right-hand side of Eq. (4) is dependent on the system parameters but otherwise changes only if the object depth changes. Hence, for an object at any particular depth, it can be shown that $$\frac{n_p}{b} = \text{constant} \quad (5)$$

although the constant will be different for different depths. Eq. (5) states that for an object at a given depth, images of that object taken from different viewpoints will exhibit different disparities, but the disparities are proportional to the baseline of the viewpoint. A viewpoint with a two times longer baseline will produce an image with a disparity that is also two times larger. Conversely, if the disparity is known for one viewpoint, then it can also be calculated for the other viewpoints. The disparities at different viewpoints should satisfy the known relationship.

If strong chromatic aberration is observed, the focal length of the main lens is wavelength dependent and is indicated as $F(\lambda_0) + \Delta(\lambda)$, where $\lambda_0$ is the reference wavelength. Then we rewrite Eq. (4) as $$\frac{n_p}{b} = \frac{z_2}{d_m}\left(\frac{1}{F(\lambda_0) + \Delta(\lambda)} - \frac{1}{z_1}\right) - \frac{1}{d_m} \quad (6)$$

The relationship between the disparity and baseline in Eq. (5) is then modified as $$\frac{n_p}{b} = \text{constant}(\lambda_0) + \varepsilon(\lambda) \quad (7)$$

and $\varepsilon(\lambda)$ can be estimated based on system configurations or calibration. This equation compensates for the different focal length corresponding to different spectral filters.

In the case when the object is at near distance, the system is still out-of-focus at the microlens array as shown in FIG. 6B. It can be seen that when the object point changes from far distance to near distance, the shift at the microlens array is flipped and becomes positive, yielding $$\frac{\rho}{b} = \frac{z_2 - d}{d} \quad (8)$$

This is the same as Eq. (2), and therefore the derivation shown in Eq. (5) is also true for this case.

Based on Eq. (4) the reciprocal of object depth can be calculated as $$\frac{1}{z_1} = \frac{1}{F} - \frac{1}{z_2}\left(\frac{n_p d_m}{b} + 1\right) \quad (9)$$

Eqs. (4) and (9) give the relation between depth and disparity. Disparity can be calculated from depth using Eq. (4). Depth can be calculated from disparity using Eq. (9).

This example has been simplified for clarity. More accurate models can be derived to account for more complex systems and more complex effects, for example non-ideal optics, more accurate ray tracing, other wavelength effects such as chromatic aberrations, etc. The principles illustrated with this simple model also apply to more complex models. The known variation of disparity with respect to viewpoint (which is represented by baseline distance b in this example) is used to reconcile the multispectral multiview images.

In some cases, a deblurring or resolution enhancement of the spectral or multiview images may be performed before the disparity estimation, e.g. in the case that the filter array includes filters in the visible and in the near-IR range, some of the spectral images might include some blur.

In addition, disparity maps computed from different pairs of spectral views can be computed and combined into one disparity/depth map.

As shown above in FIG. 4A, the same object that appears in one spectral image may completely disappear at another band due to different filter spectral sensitivity, and therefore estimating depth based on only two views is inaccurate. In FIG. 5, the disparity/depth map is estimated 520 based on image information from multiple views using the derived relationship between different views.

Figure 7A:
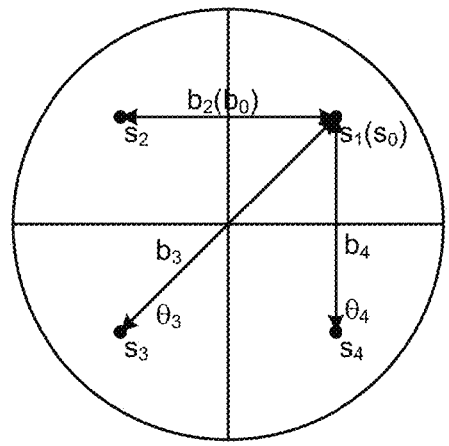
FIGS. 7A-7B show examples for a main lens aperture with four-filter and six-filter layouts, respectively.
Figure 7B:
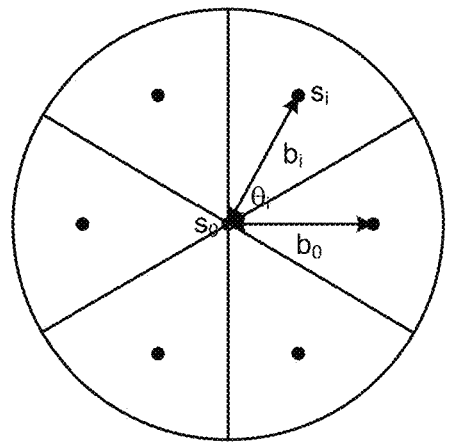

FIGS. 7A-7B show examples for a main lens aperture with four-filter and six-filter layouts, respectively. In this example, the central viewpoint of each filter partition is indicated by a small circle and the images from these viewpoints are used to reconstruct the disparity-compensated image. A reference viewpoint is first selected and used as a basis to compute the baseline between viewpoints.

The four-filter layout (FIG. 7A) includes four filters arranged in a 2×2 grid. The central viewpoints of the filters are labeled as $s_1$-$s_4$. The viewpoint $s_1$ is selected to serve as the reference viewpoint $s_0$, as indicated by the parenthetical $(s_0)$. The baselines between the reference viewpoint $s_0$ and each of the other viewpoints $s_i$ is defined by a baseline distance $b_i$ and a baseline angle $\theta_1$. The baseline to viewpoint $s_2$ is selected as the reference baseline, as indicated by the $(b_0)$.

For the case of the six-filter layout (FIG. 7B), a virtual reference viewpoint $s_0$ is defined at the center of the main lens aperture, and a reference baseline $b_0$ is also defined. The baselines $b_i$ and angle $\theta_i$ between each of the viewpoints and the virtual reference viewpoint $s_0$ is then computed based on the system's configuration.

The spectrally filtered images are reconstructed 510 for the selected viewpoints. The disparities between each view and the reference view are derived based on Eq. (5). If the disparities were known, then each spectrally filtered image could be translated to the reference viewpoint using the transformation $$[x \quad y \quad I(b_i, \theta_i, x, y)] = \qquad (10)$$
$$[v \quad w \quad I(b_i, \theta_i, v, w)] \begin{bmatrix} 1 & 0 & 0 \\ 0 & 1 & 0 \\ \frac{b_i}{b_0}n_{p0}\cos\theta_i & \frac{b_i}{b_0}n_{p0}\sin\theta_i & 1 \end{bmatrix}$$

where (v, w) is the pixel location before compensation and $I(b_i,\theta_i,v,w)$ is the pixel value at (v,w), $(b_i,\theta_i)$ defines the baseline to the reference viewpoint, and (x,y) and $I(b_i,\theta_i,x,y)$ are the pixel location and pixel value after compensation. In addition, $b_0$ is the reference baseline and $n_{p0}$ is the disparity for the reference baseline. Note that the amount of translation required to compensate for disparity is a function of the difference in viewpoint as defined by baseline $(b_i, \theta_i)$ and is also a function of the disparity parameter $n_{p0}$. In some implementations, subpixel disparities for different sub-aperture views are considered. In that case, disparity values can be computed not only for integer pixel values, but also for fractional pixel values using standard techniques for sub-pixel disparity estimation.

The next step is to estimate the value of the parameter $n_{p0}$ based on the available images. The estimated disparities at each pixel is found based on $$\hat{n}_p(x,y) = \mathrm{argmax}\{\mathrm{corr}(I_1, \ldots, I_N)\} \qquad (11)$$

where $\hat{n}_p(x,y)$ is the estimated disparity at pixel (x,y), $I_1 \ldots I_N$ are the translated images calculated using Eq. (10), and corr is a correlation computation operator. The correlation can be calculated either globally or locally by using a sliding window. Different types of correlation computations can be used, such as sum of absolute different, normalized cross correlation, multiplied eigenvalues of covariance matrix, phase correlation, etc.

If the optical properties of the object are known, we can also estimate the radiance passed through different spectral, polarization or neutral density filters, and then apply corresponding weights to each spectral channel when the correlation is computed. For example, if N filters are used with corresponding calculated weights $w_1, \ldots w_N$, the estimated disparity may be calculated as $$\hat{n}_p(x,y) = \mathrm{argmax}\{\mathrm{corr}(w_1 I_1, \ldots, w_N I_N)\} \qquad (12)$$

FIG. 8 is a disparity map of the images shown in FIG. 4. Note that the values range from near to far, so the actual values plotted in FIG. 8 are depth. However, there is direct relationship between depth and disparity, so the depth map can be considered to be a form of disparity map.

Once the depth/disparity map is known, the multiview images are corrected 530 for parallax. Based on the estimated disparity map, the extracted multispectral images from different filter partitions are translated to the reference viewpoint using Eq. (10). After the translation, the spectral images are registered with the reference viewpoint at each pixel, thus reducing the parallax.

Spectral images are then reconstructed 540 based on the parallax rectified multiview images. The spectral images can be reconstructed by using only one image from each filter partition, and applying parallax rectification to each pixel in that image. The spectral images can also be reconstructed by using multiple views (i.e., multiple images from different viewpoints) from each filter partition. In one approach, multiple views from each filter partition are parallax rectified using Eq. (10) and are then averaged to reconstruct one "average" image at each spectral band.

FIG. 9 shows the spectrally reconstructed image of the images shown in FIG. 4, using the disparity map of FIG. 8. Details 920 and 921 correspond to details 420 and 421 in FIG. 4B. The color fringing is significantly improved in FIG. 9.

Figure 10:
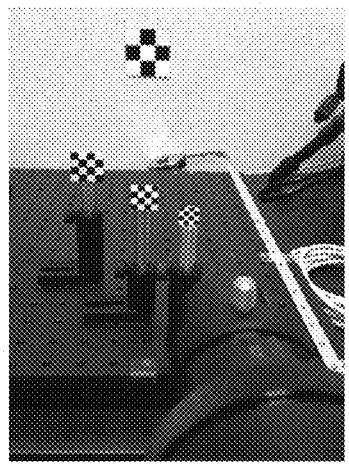
FIG. 10 shows an experimental setup to test parallax rectification.

We also evaluate the performance of this specific approach based on different metrics. We first evaluate the absolute error based on parallax rectification and different spectral image reconstruction methods. To evaluate the absolute error, checkerboards are placed at different distances from 10 cm to 45 cm, and spectral images are reconstructed using different methods. The experimental setup to test parallax rectification is shown in FIG. 10. The absolute error is computed using $$e = \frac{\sum_{i=1}^{M} |I_i - I_r|}{N} \qquad (13)$$

where e is the absolute error, $I_r$ is a reference spectral image, $I_i$ is one of the other reconstructed images, M is the total number of spectral images used for calculation, and N is the total number of pixels.

Figure 11:
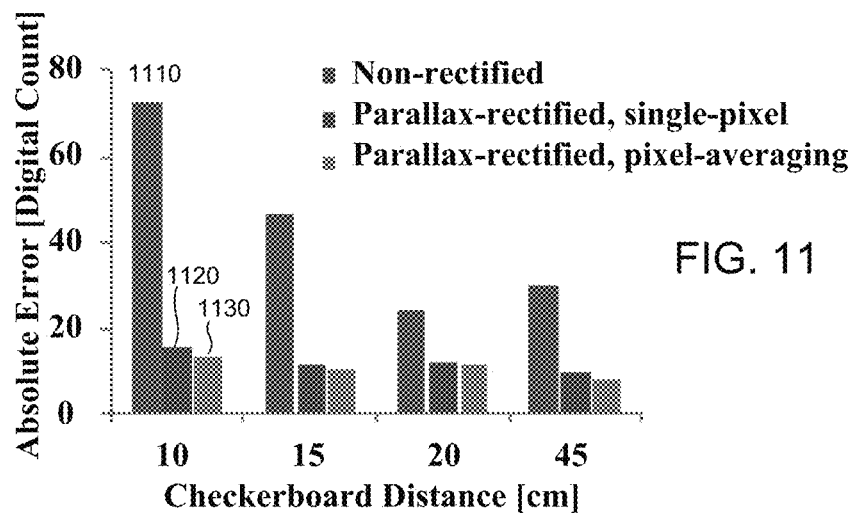
FIG. 11 is a bar chart showing results of the experiment of FIG. 10.

FIG. 11 is a bar chart showing the results of the experiment of FIG. 10. Each set of three bars is for a different position of the checkerboard. Within each set of three bars, the left bar 1110 shows the error without parallax rectification. The middle bar 1120 shows the error with parallax rectification as described above, using a single view for each spectral band. The right bar 1130 shows the error with parallax rectification, averaging multiple pixels for each spectral band. After parallax rectification, the absolute error is significantly reduced, and the single pixel extraction and pixel averaging methods are quite comparable.

Figure 12:
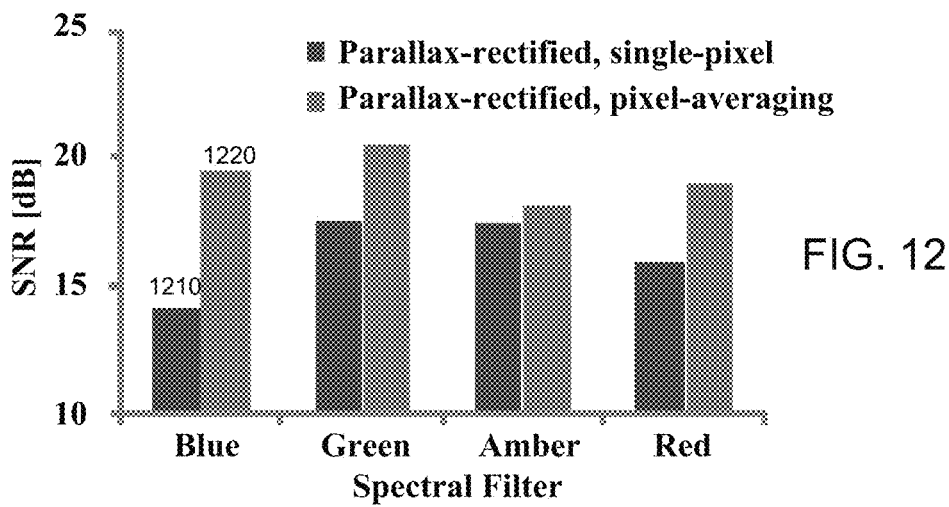
FIG. 12 is a bar chart showing signal-to-noise ratio (SNR) for the single image and image averaging approaches.

FIG. 12 is a bar chart showing signal-to-noise ratio (SNR) for the single image and image averaging approaches. Each set of two bars is for a different color filter. Within each set, the left bar 1210 is for single image and the right bar 1220 is for multi-image. It is shown that after parallax rectification the pixel averaging method can enhance the SNR.

Although the detailed description contains many specifics, these should not be construed as limiting the scope of the invention but merely as illustrating different examples and aspects of the invention. It should be appreciated that the scope of the invention includes other embodiments not discussed in detail above. For example, a plenoptic camera was used as an example of a multispectral multiview system, but other imaging systems can also be used. A camera array using different spectral filters can also be used to capture multispectral multiview images. The invention can also be applied to video streams, in addition to still images.

The multiviews do not have to be captured from regularly spaced viewpoints or viewpoints laid out on a grid. Rather, an irregular collection of viewpoints may also be used. The multiviews also need not be multispectral. Polarization filters, neutral density filters, and clear apertures may be used in addition to or in place of spectral filters. For a clear aperture, we can first estimate disparity/depth using this technique. Then, we can compensate for disparity based on Eq. (5) and combine the disparity-compensated views to enhance SNR or perform super-resolution.

Per-pixel disparities in spectral images or different views can be calculated using the methods described above, but applying it to different sets of the spectral images/views. In a case with four filters in the aperture, there are a number of views in each spectral band available. The resulting disparity maps can be combined to produce a refined disparity map using. e.g., super-resolution methods to combines results of different depth map algorithms.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, aspects of the invention is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A computer-implemented method for estimating disparities from multiview images, the method comprising:
   receiving N images of a scene, N≥3, the images taken from different viewpoints;
   modeling disparity between any pair of the N images as a function of (a) a disparity parameter applicable to all pairs of images, and (b) a viewpoint difference between the viewpoints of the images in the pair; and
   estimating the disparity parameter based on a set of pairs of images from the N images, based on the modeling of disparity for each pair in the set, and based on the viewpoint difference between viewpoints for each pair in the set.

2. The computer-implemented method of claim 1 wherein estimating the disparity parameter comprises:
   estimating the disparity parameter further based on increasing correlations between the pairs in the set after parallax rectification.

3. The computer-implemented method of claim 1 wherein the viewpoint difference between two viewpoints for a pair of images is defined by a baseline between the two viewpoints, the baseline having a baseline distance and an angle of the baseline.

4. The computer-implemented method of claim 3 wherein the disparity between two viewpoints for a pair of images is modeled as (disparity between the two viewpoints)/(baseline distance between the two viewpoints)=a known function.

5. The computer-implemented method of claim 1 wherein one of the N images is selected as a reference image, the set of pairs are pairs consisting of the reference image and each of the other N images, and estimating the disparity parameter is based on the viewpoint differences between the reference image and each of the other images.

6. The computer-implemented method of claim 1 wherein the disparity between any pair of the N images is further a function of a location in the image.

7. The computer-implemented method of claim 1 wherein different images contain different spectral content and not all objects are visible in all images due to the different spectral content of the images.

8. The computer-implemented method of claim 1 further comprising:
estimating a disparity map for the images based on the disparity parameter and the viewpoint differences, the disparity map defining disparity as a function of location in the images.

9. The computer-implemented method of claim 1 further comprising:
estimating a depth map for the images based on the disparity parameter and the viewpoint differences and on a relationship between disparity and depth, the depth map defining depth as a function of location in the images.

10. The computer-implemented method of claim 1 further comprising:
applying parallax rectification to the images, the parallax rectification based on the disparity parameter and the viewpoint differences.

11. The computer-implemented method of claim 10 further comprising:
combining the parallax rectified images into a multispectral image.

12. The computer-implemented method of claim 1 wherein the images include red, green and blue filtered images.

13. The computer-implemented method of claim 1 wherein the viewpoints for the images are arranged in a grid.

14. The computer-implemented method of claim 13 wherein N=4 and the viewpoints for the four images are arranged in a square.

15. The computer-implemented method of claim 1 wherein the N images are captured by N separate cameras.

16. The computer-implemented method of claim 1 wherein the N images are captured by a single plenoptic camera.

17. A non-transitory computer readable medium configured to store program code, the program code comprising instructions for estimating disparities from multiview images, the instructions when executed by a processor cause the processor to execute a method comprising:
receiving N images of a scene, N≥3, the images taken from different viewpoints;
modeling disparity between any pair of the N images as a function of (a) a disparity parameter applicable to all pairs of images, and (b) a viewpoint difference between the viewpoints of the pair of images; and
estimating the disparity parameter based on a set of pairs of images from the N images, based on the modeling of disparity for each pair in the set, and based on the viewpoint differences between viewpoints for each pair in the set.

18. The non-transitory computer readable medium of claim 17 wherein different images contain different spectral content.

19. A multiview camera system comprising:
one or more cameras that capture N images of a scene, N≥3, the images taken from different viewpoints; and
a processing module configured to:
receive the N images;
model disparity between any pair of the N images as a function of (a) a disparity parameter applicable to all pairs of images, and (b) a viewpoint difference between the viewpoints of the pair of images; and
estimate the disparity parameter based on a set of pairs of images from the N images, based on the modeling of disparity for each pair in the set, and based on the viewpoint differences between viewpoints for each pair in the set.

20. The multiview camera system of claim 19 wherein different images contain different spectral content.

* * * * *